US009419278B2

(12) United States Patent
Wang et al.

(10) Patent No.: US 9,419,278 B2
(45) Date of Patent: Aug. 16, 2016

(54) RECHARGEABLE METAL-ION BATTERY WITH NON-AQUEOUS HYBRID ION ELECTROLYTE

(71) Applicant: Sharp Laboratories of America, Inc., Camas, WA (US)

(72) Inventors: Long Wang, Vancouver, WA (US); Yuhao Lu, Vancouver, WA (US); David Evans, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 237 days.

(21) Appl. No.: 14/271,498

(22) Filed: May 7, 2014

(65) Prior Publication Data
US 2014/0239907 A1    Aug. 28, 2014

Related U.S. Application Data

(63) Continuation-in-part of application No. 14/230,882, filed on Mar. 31, 2014, which is a continuation-in-part of application No. 14/198,755, filed on Mar. 6, 2014, which is a continuation-in-part of application No.
(Continued)

(51) Int. Cl.
*H01M 2/00* (2006.01)
*H01M 4/58* (2010.01)
(Continued)

(52) U.S. Cl.
CPC .............. *H01M 4/58* (2013.01); *H01M 10/049* (2013.01); *H01M 10/054* (2013.01); *H01M 10/058* (2013.01); *H01M 10/0525* (2013.01); *H01M 10/44* (2013.01); *H01M 4/136* (2013.01); *H02J 7/0042* (2013.01); *Y02E 60/122* (2013.01); *Y10T 29/49108* (2015.01)

(58) Field of Classification Search
CPC ..... H01M 4/58; H01M 10/056; H01M 10/058; H01M 10/44; H01M 2/1653; H01M 2/1686
See application file for complete search history.

(56) References Cited

U.S. PATENT DOCUMENTS

2012/0328936 A1*  12/2012  Wessells ............. H01M 10/054
429/188

OTHER PUBLICATIONS

M. Hu and J. S. Jiang, "Facile Synthesis of Air-Stable Prussian White Microcubes via a Hydrothermal Method", Materials Research Bulletin 2011, 46, 702-707.
(Continued)

*Primary Examiner* — Cynthia H Kelly
*Assistant Examiner* — Monique Wills
(74) *Attorney, Agent, or Firm* — Law Office of Gerald Maliszewski; Gerald Maliszewski (57) ABSTRACT

A method is provided for forming a rechargeable metal-ion battery with a non-aqueous hybrid ion electrolyte. The method provides a transition metal hexacyanometallate (TM-HCM) cathode $(A_X M1_Y M2_Z(CN)_N \cdot MH_2O)$, where "A" is from a first group of metals, and M1 and M2 are transition metals. The electrolyte includes a first type of cation from the first group of metals, different than "A". The method connects the cathode and anode to external circuitry to perform initial charge/discharge operations. As a result, a hybrid ion electrolyte is formed including the first type of cation and "A" cations. Subsequently, cations are inserted into the anode during charging, which alternatively may be only "A" cations, only the first type of cation, or both the "A" cations and the first type of cation. Only "A" cations, only the first type, or both "A" and the first type of cation are inserted into the TMHCM during discharge.

24 Claims, 5 Drawing Sheets

Related U.S. Application Data

14/198,702, filed on Mar. 6, 2014, which is a continuation-in-part of application No. 14/198,663, filed on Mar. 6, 2014, which is a continuation-in-part of application No. 14/193,782, filed on Feb. 28, 2014, which is a continuation-in-part of application No. 14/193,501, filed on Feb. 28, 2014, which is a continuation-in-part of application No. 14/174,171, filed on Feb. 6, 2014, which is a continuation-in-part of application No. 14/067,038, filed on Oct. 30, 2013, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, now Pat. No. 9,269,953.

(51) Int. Cl.

| | |
|---|---|
| *H01M 10/058* | (2010.01) |
| *H01M 10/44* | (2006.01) |
| *H01M 10/0525* | (2010.01) |
| *H01M 10/054* | (2010.01) |
| *H01M 10/04* | (2006.01) |
| *H01M 4/136* | (2010.01) |
| *H02J 7/00* | (2006.01) |

(56) References Cited

OTHER PUBLICATIONS

S-H. Lee and Y-D. Huh, "Preferential Evolution of Prussian Blue's Morphology from Cube to Hexapod", The Bulletin of the Korean Chemical Society 2012, 33, 1078-1060.

M. Hu, J-S. Jiang, C-C. Lin, and Y. Zeng, "Prussian Blue Mesocrystals: an Example of Self-Construction", CrystEngComm 2010, 12, 2679-2683.

M. Hu, R-P. Ji, and J-S. Jiang, "Hydrothermal Synthesis of Magnetite Crystals: from Sheet to Pseudo-Octahedron", Materials Research Bulletin 2010, 45, 1811-1715.

V. D. Neff, "Some Performance Characteristics of a Prussian Blue Battery", Journal of Electrochemical Society 1985, 132, 1382-1384.

N. Imanishi et al., "Lithium Intercalation Behavior into Iron Cyanide Complex as Positive Electrode of Lithium Secondary Battery", Journal of Power Sources 1999, 79, 215-219.

Y. Lu, L. Wang, J. Cheng, and J. B. Goodenough, "Prussian Blue: a New Framework for Sodium Batteries", Chemistry Communications 2012, 46, 6544-6546.

L. Wang et al., "A Superior Low-Cost Cathode for a Na-ion Battery", Angewandte Chemie International Edition 2013, 52, 1964-1967.

A. Eftekhart, "Potassium Secondary Cell Based on Prussian Blue Cathode", Journal of Power Sources 2004, 126, 221-228.

C. D. Wessells et al., "Copper Hexacyanoferrate Battery Electrodes with Long Cycle Life and High Power", Nature Communications 2011, 2, Article No. 550.

C. D. Wessells et al., "Nickel Hexacyanoferrate Nanoparticle Electrodes for Aqueous Sodium and Potassium Ion Batteries", Nano Letters 2011, 11, 5421-5425.

C. D. Wessells et al., "The Effect of Insertion Species on Nanostructured Open Framework . . . ", Journal of the Electrochemical Society 2012, 159, A98-A103.

T. Matsuda, M. Takachi, and Y. Moritomo, "A Sodium Manganese Ferrocyanide Thin Film for Na-ion Batteries", Chemical Communications 2013, 49, 2750-2752.

S-H. Yu et al., "Iron Hexacyanoferrate Nanoparticles as Cathode Materials for Lithium and Sodium Rechargeable Batteries", ECS Electrochemistry Letters 2013, 2, A39-A41.

D. Asakura et al., Fabrication of a cyanide-bridged coordination polymer electrode for enhanced electrochemical ion storage ability, J. Phys. Chem. C, 116(2012) 8364-8369.

* cited by examiner

RECHARGEABLE METAL-ION BATTERY WITH NON-AQUEOUS HYBRID ION ELECTROLYTE

RELATED APPLICATIONS

This application is a Continuation-in-Part of an application entitled, REACTIVE SEPARATOR FOR A METAL-ION BATTERY, invented by Long Wang et al, Ser. No. 14/230,882, filed Mar. 31, 2014;

which is a Continuation-in-Part of an application entitled, NASICON-POLYMER ELECTROLYTE STRUCTURE, invented by Long Wang et al, Ser. No. 14/198,755, filed Mar. 6, 2014;

which is a Continuation-in-Part of an application entitled, BATTERY WITH AN ANODE PRELOADED WITH CONSUMABLE METALS, invented by Yuhao Lu et al, Ser. No. 14/198,702, filed Mar. 6, 2014;

which is a Continuation-in-Part of an application entitled, BATTERY ANODE WITH PRELOADED METALS, invented by Long Wang et al, Ser. No. 14/198,663, filed Mar. 6, 2014;

which is a Continuation-in-Part of an application entitled, METAL BATTERY ELECTRODE WITH PYROLYZED COATING, invented by Yuhao Lu et al, Ser. No. 14/193,782, filed Feb. 28, 2014;

which is a Continuation-in-Part of an application entitled, METAL HEXACYANOMETALLATE ELECTRODE WITH SHIELD STRUCTURE, invented by Yuhao Lu et al, Ser. No. 14/193,501, filed Feb. 28, 2014;

which is a Continuation-in-Part of an application entitled, CYANOMETALLATE CATHODE BATTERY AND METHOD FOR FABRICATION, invented by Yuhao Lu et al, Ser. No. 14/174,171, filed Feb. 6, 2014;

This application is a Continuation-in-Part of an application entitled, SODIUM IRON(II)-HEXACYANOFERRATE(II) BATTERY ELECTRODE AND SYNTHESIS METHOD, invented by Yuhao Lu et al, Ser. No. 14/067,038, filed Oct. 30, 2013;

which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013;

which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013;

which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012.

All these applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical cells and, more particularly, to a metal-ion battery using a hybrid ion electrolyte with two types of cations.

2. Description of the Related Art

Transition metal hexacyanoferrates (TMHCFs) with large interstitial spaces have been investigated as cathode materials for rechargeable lithium-ion batteries [1, 2], sodium-ion batteries [3, 4], and potassium-ion batteries [5]. With an aqueous electrolyte containing the proper alkali-ions or ammonium-ions, copper and nickel hexacyanoferrates ((Cu,Ni)—HCFs) exhibited a very good cycling life that retained an 83% capacity after 40,000 cycles at a charge/discharge current of 17 C (1 C=150 milliamp hours per gram (mAh/g) [6-8]. However, the materials demonstrated low capacities and energy densities because (1) just one sodium-ion can be inserted/extracted into/from each Cu-HCF or Ni—HCF formula and (2) these TMHCFs electrodes must be operated below 1.23 V due to water electrochemical window. The electrochemical window of a substance is the voltage range between which the substance is neither oxidized nor reduced. This range is important for the efficiency of an electrode, and once out of this range, water becomes electrolyzed, spoiling the electrical energy intended for another electrochemical reaction. To correct these shortcomings, manganese hexacyanoferrate (Mn—HCF) and iron hexacyanoferrate (Fe—HCF) were used as cathode materials in a non-aqueous electrolyte [9, 10]. Assembled with sodium-metal anode, Mn—HCF and Fe—HCF electrodes cycled between 2.0V and 4.2 V and delivered capacities of about 150 mAh/g.

However, the as-prepared TMHCF, which consists of an alkali metal such as Li, Na and K inside the Prussian Blue framework in the discharged state, exhibits rapid capacity decay during repeated sodium insertion/extraction in a non-aqueous electrolyte like carbonate-based organic electrolytes. For example, $Na_2MnFe(CN)_6$ shows a capacity retention less than 75% after 100 cycles under a modest current density, and $Na_2Fe(CN)_6$ prepared via hydrothermal also exhibits a 20% capacity loss in 120 cycles. Such poor capacity retention hinders commercial applications of TMHCF-based rechargeable batteries. Although Berlin Green, which has an empty framework of $FeFe(CN)_6$, has demonstrated a 1000× cycle life, it is impractical for large scale applications because it requires a sodium metal anode as a sodium source, which is a serious safety issue for batteries. On the other hand, the substitution of high-spin iron or manganese with nickel results in stable capacity retention, but the reversible capacity is less than 80 mAh/g, which is too low for practical applications.

It would be advantageous if an electrolyte containing hybrid conductive ions, such as alkali and alkaline earth ions, could be used in a TMHCF-based metal-ion battery to enable ultra-long cycle lifetimes.

[1] V. D. Neff, Some performance characteristics of a Prussian Blue battery, Journal of Electrochemical Society, 132 (1985) 1382-1384.

[2] N. Imanishi, T. Morikawa, J. Kondo, Y. Takeda, O. Yamamoto, N. Kinugasa, T. Yamagishi, Lithium intercalation behavior into iron cyanide complex as positive electrode of lithium secondary battery, Journal of Power Sources, 79 (1999) 215-219.

[3] Y. Lu, L. Wang, J. Cheng, J. B. Goodenough, Prussian blue: a new framework for sodium batteries, Chemistry Communication, 48 (2012) 6544-6546.

[4] L. Wang, Y. Lu, J. Liu, M. Xu, J. Cheng, D. Zhang, J. B. Goodenough, A superior low-cost cathode for a Na-ion battery, Angew. Chem. Int. Ed., 52 (2013) 1964-1967.

[5] A. Eftekhari, Potassium secondary cell based on Prussian blue cathode, J. Power Sources, 126 (2004) 221-228.

[6] C. D. Wessells, R. A. Huggins, Y. Cui, Copper hexacyanoferrate battery electrodes with long cycle life and high power, Nature Communication, 2 (2011) 550.

[7] C. D. Wessells, S. V. Peddada, R. A. Huggins, Y. Cui, Nickel hexacyanoferrate nanoparticle electrodes for aqueous sodium and potassium ion batteries. Nano Letter, 11 (2011) 5421-5425.

[8] C. D. Wessells, S. V. Peddada, M. T. McDowell, R. A. Huggins, Y. Cui, The effect of insertion species on nanostructured open framework hexacyanoferrate battery electrode, J. Electrochem. Soc., 159 (2012) A98-A103.

[9] T. Matsuda, M. Takachi, Y. Moritomo, A sodium manganese ferrocyanide thin film for Na-ion batteries, Chemical Communications, DOI: 10.1039/C3CC38839E.

[10] S.-H. Yu, M. Shokouhimehr, T. Hyeon, Y.-E. Sung, Iron hexacyanoferrate nanoparticles as cathode materials for lithium and sodium rechargeable batteries, ECS Electrochemistry Letters, 2 (2013) A39-A41.

[11] D. Asakura, M. Okubo, Y. Mizuno, T. Kudo, H. Zhou, K. Ikedo, T. Mizokawa, A. Okazawa, N. Kojima, Fabrication of a cyanide-bridged coordination polymer electrode for enhanced electrochemical ion storage ability, J. Phys. Chem. C, 116 (2012) 8364-8369.

SUMMARY OF THE INVENTION

Disclosed herein is a rechargeable metal-ion battery with a non-aqueous electrolyte solvent and hybrid conductive cation. The electrolyte contains at least two different ions $A^{m+}$, $B^{n+}$. A and B are typically an alkali or alkaline earth metal, and m, n=1, 2, 3. The ion in the electrolyte has at least a concentration of 1% in molar ratio, as compared with the total ion concentration. The hybrid ionic electrolyte can be formed by adding corresponding soluble salts into the electrolyte or by extraction of a ternary ion from the electrode material during the initial battery cycle. Ions in the electrolyte can either participate in the electrochemical reaction or not. The battery may comprise a cathode and an anode having different reaction selectivity towards the ions in the electrolyte. For example, in a battery with a transition metal hexacyanometallate (TMHCM) cathode, a hard carbon anode, and an electrolyte containing sodium and potassium ion, both the sodium and potassium ions can be inserted into the TMHCM cathode, but only sodium ion can be inserted into the hard carbon anode.

A sodium-ion battery with a TMHCF cathode exhibits a high capacity and a long cycle life using such a hybrid ion electrolyte, and an example is presented to illustrate proof of concept.

Accordingly, a method is provided for forming a rechargeable metal-ion battery with a non-aqueous hybrid ion electrolyte. The method provides a TMHCM cathode having a chemical formula $A_XM1_YM2_Z(CN)_N \cdot \text{M}H_2O$, where "A" is selected from a first group of metals, and M1 and M2 are transition metals. The battery includes an electrolyte includes a first type of cation selected from the first group of metals, but different than "A", and an anode. The method connects the cathode and anode to a current source to perform an initial charge operation. Then, the cathode and anode are connected to a load to perform an initial discharge operation. As a result, a hybrid ion electrolyte is formed including the first type of cation and "A" cations.

The first group of metals includes an alkali or alkaline metals. The anode can likewise be made from carbonaceous materials, alkali metals, alkaline earth metals, alloys of tin, lead, silicon, phosphorous, or germanium, or titanates including alkali or alkaline earth metals.

Subsequent to the initial charge and discharge operations, the cathode and anode are connected to a current source for charging. As a result, cations are inserted into the anode. The cations may alternatively be only "A" cations, only the first type of cation, or both the "A" cations and the first type of cation. Subsequent to charging the battery, the method connects the cathode and anode to a load and discharges the battery. As a result, cations are inserted into the TMHCM particles. The cations may alternatively be only "A" cations, only the first type of cation, or both "A" cations and the first type of cation.

Additional details of the above-described method, a method for operating a rechargeable metal-ion battery with a non-aqueous hybrid ion electrolyte, and a rechargeable metal-ion battery are presented below.

DETAILED DESCRIPTION

Figure 1:
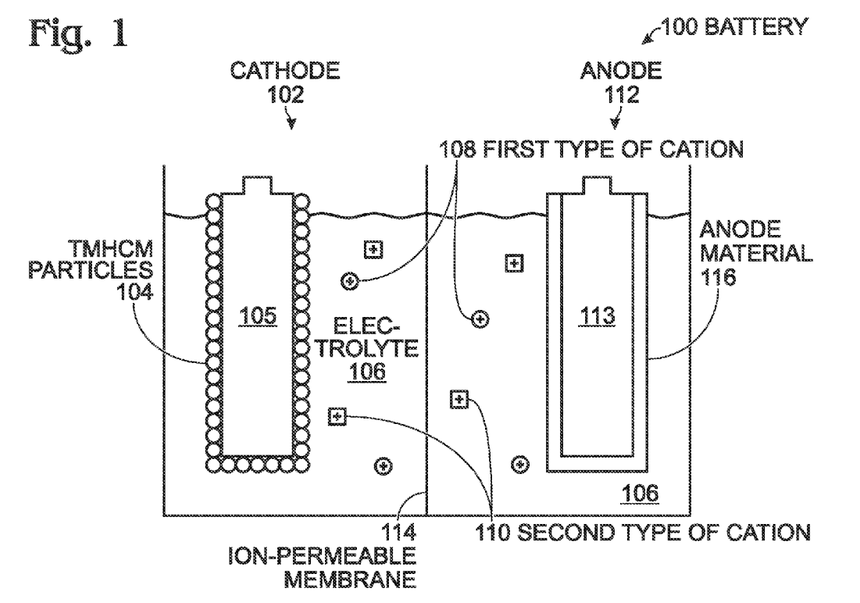
FIG. 1 is a partial cross-sectional view of a rechargeable metal-ion battery with a hybrid ion electrolyte.

FIG. 1 is a partial cross-sectional view of a rechargeable metal-ion battery with a hybrid ion electrolyte. The battery 100 comprises a cathode 102 including transition metal hexacyanometallate (TMHCM) particles 104 overlying a current collector 105. Although not explicitly shown, a polymeric binder such as polytetrafluoroethylene (PTFE) or polyvinylidene difluoride (PVDF) may be used to provide adhesion between electrode materials and current collector 105 to improve the overall physical stability of the cathode 102.

The TMHCM particles 104 have the chemical formula $A_XM1_YM2_Z(CN)_N \cdot MH_2O$;
where "A" is selected from a first group of metals;
where M1 and M2 are transition metals;
where X is less than or equal to 2;
where Y is less than or equal to 1;
where Z is less than or equal to 1;
where N is less than or equal to 6; and,
where M is less than or equal to 20.

A hybrid ionic electrolyte 106 includes a first type of cation 108 selected from the first group of metals and a second type of cation 110 selected from the first group of metals, but different than the first type of cation 108. The electrolyte 106 includes a non-aqueous solvent (i.e. is a non-aqueous electrolyte).

The battery 100 further comprises an anode 112. Although not explicitly shown, a polymeric binder such as PTFE or PVDF may be used to provide adhesion between electrode materials and current collector 113 to improve the overall physical stability of the anode 112. Typically, an ion-permeable membrane 114 separates (electrically insulates) the anode 112 from the cathode 102.

The anode 112, or more explicitly the anode material 116 overlying current collector 115 may be carbonaceous materials, alkali metals, alkaline earth metals, alloys including tin, alloys including lead, alloys including silicon, alloys including phosphorous, alloys including germanium, titanates including alkali metals, titanates including alkaline earth metals, or combinations thereof. Some examples of a carbonaceous material include carbon black, activated carbon, carbon cloth, and carbon paper. Typically, a titanate is an inorganic compound composed of titanium oxides. The first group of metals includes lithium (Li), sodium (Na), potassium (K), rubidium (Rb), cesium (Cs), calcium (Ca), strontium (Sr), barium (Ba), silver (Ag), aluminum (Al), magnesium (Mg), and combinations thereof.

M1 and M2 are each independently derived, meaning that they may be the same or different metals. Typical M1 and M2 metals include titanium (Ti), vanadium (V), chromium (Cr), manganese (Mn), iron (Fe), cobalt (Co), nickel (Ni), copper (Cu), zinc (Zn), Ca, Mg, strontium (Sr), and barium (Ba). Note: the materials listed above are examples used to illustrate the invention and do not necessarily represent an exhaustive list of all possible materials.

Typically, the first type of cation 108 and the second type of cation 110 in the electrolyte 106 each comprise at least 1% in molar ratio as compared to the total ion concentration of cations in the electrolyte. This relationship holds true for all battery states: charged, discharged, and in-between.

In one aspect, the cathode TMHCM particles 104 include cations from only the first type of cation 108 when the battery is in the discharged state. Alternatively, the cathode TMHCM particles 104 may include cations from both the first type of cation 108 and the second type of cations 110, when the battery is in a discharged state.

In another aspect, the anode 112 includes cations from only one type of cation in the electrolyte 106 (e.g. the first type of cation 108 or the second type of cations 110), when the battery is in a charged state. Alternatively, the anode 112 includes cations from both the first type of cation 108 and the second type of cation 110, when the battery is in a charged state.

It has been reported in the literature that transition metal hexacyanoferrates (TMHCFs), which are a type of TMHCM, can be dissolved into a carbonate-based non-aqueous electrolyte during lithium insertion/extraction, resulting in fast capacity decay upon cycling [11]. In general, TMHCMs with large ions (e.g. $K^+$, $Rb^+$, $Cs^+$) inside the Prussian Blue framework have a lower solubility in an organic electrolyte, as compared to TMHCMs with smaller cations (e.g. $Li^+$, $Na^+$), inside the nanocubes of the TMHCM framework. However, it is more difficult for an ion with a large radius, such as $Cs^+$, to diffuse inside the Prussian Blue framework, as compared with small ions like $Li^+$ or $Na^+$, which therefore compromises the electrochemical behavior of the TMHCM-based battery. Therefore, a hybrid ion electrolyte containing both large and small cations may be beneficial for the development of a high performance TMHCM-based metal-ion battery, because the large cations can suppress TMHCM dissolution, while the small cations serve as guest ions for insertion into the TMHCM. A hybrid-ion non-aqueous electrolyte comprising more than one kind cation may be chosen from $Li^+$, $NH_4^+$, $Na^+$, $K^+$, $Mg^{2+}$, $Al^{3+}$, $Cs^+$, $Rb^+$, $Zn^{2+}$, $Ba^{2+}$, $Sr^{2+}$, $Ca^{2+}$. Examples based upon TMHCM-based rechargeable sodium-ion batteries are presented below.

Figure 2:
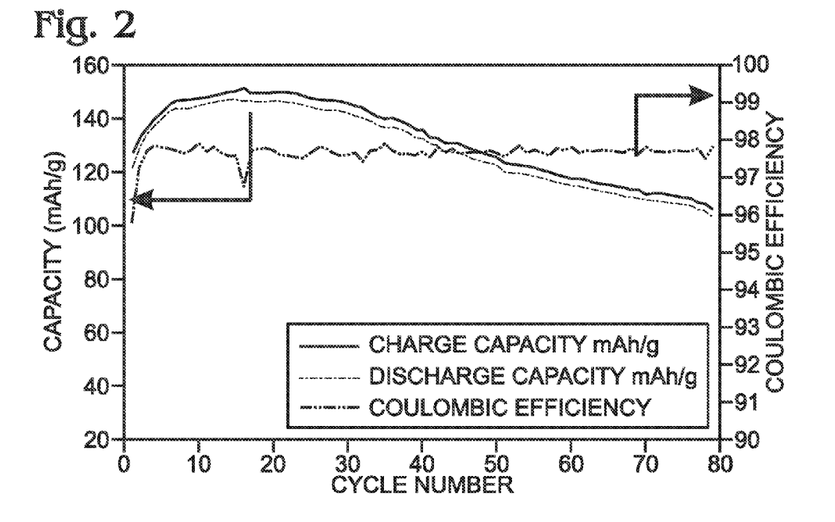
FIG. 2 is a graph depicting the capacity retention of a sodium-ion battery containing a $Na_2MnFe(CN)_6$ (MnHCF) Prussian White cathode and a sodium metal anode in a carbonate electrolyte (1M sodium hexafluorophosphate ($NaPF_6$) in ethylene carbonate and diethyl carbonate (EC/DEC=1:1 v/v).

FIG. 2 is a graph depicting the capacity retention of a sodium-ion battery containing a $Na_2MnFe(CN)_6$ (MnHCF) Prussian White cathode and a sodium metal anode in a carbonate electrolyte (1M sodium hexafluorophosphate ($NaPF_6$) in ethylene carbonate and diethyl carbonate (EC/DEC=1:1 v/v). The battery shows rapid capacity decay after the first 30 cycles and only 67% of the initial reversible capacity is left after 80 cycles. The poor capacity retention is ascribed to the dissolution of the cathode material in the electrolyte, which results in the loss of active material and damages on the solid electrolyte interface at the anode side.

Figure 3:
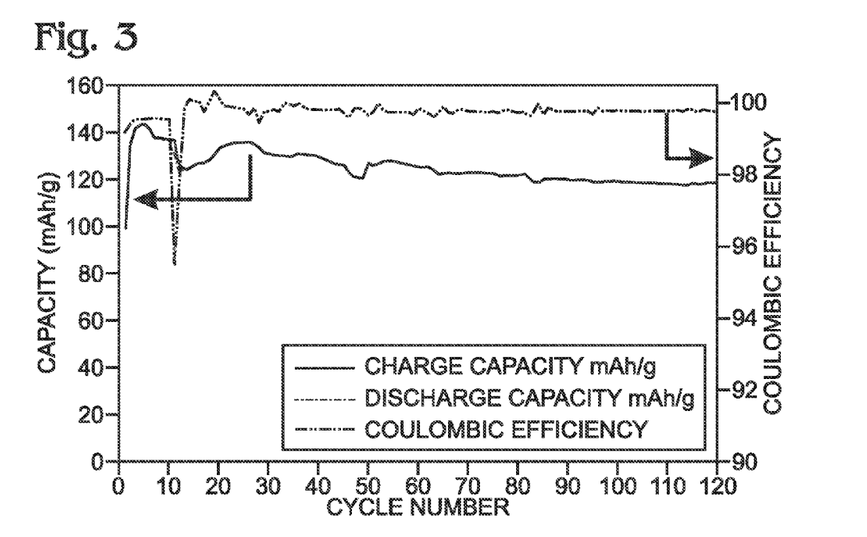
FIG. 3 is a graph showing the capacity retention of a Prussian White/Na battery with an electrolyte containing 15% potassium hexafluorophosphate ($KPF_6$) and 85% $NaPF_6$ in the same EC/DEC mixture solvent ($K^+:Na^+=15:85$).

FIG. 3 is a graph showing the capacity retention of a Prussian White/Na battery with an electrolyte containing 15% potassium hexafluorophosphate ($KPF_6$) and 85% $NaPF_6$ in the same EC/DEC mixture solvent ($K^+$:$Na^+$=15:85). The capacity of this Prussian White/sodium battery has been greatly improved by using a hybrid ion electrolyte containing potassium and sodium ion in the carbonate solvent. The battery was cycled under the same condition as that of the pure Na+ electrolyte (FIG. 2), and it showed significant improvement in terms of capacity retention. Although slow capacity fading was still observed during the first 50 cycles, the battery showed a negligible capacity decrease after 60 cycles, and 85% of the initial capacity was maintained after 120 cycles.

Figure 4:
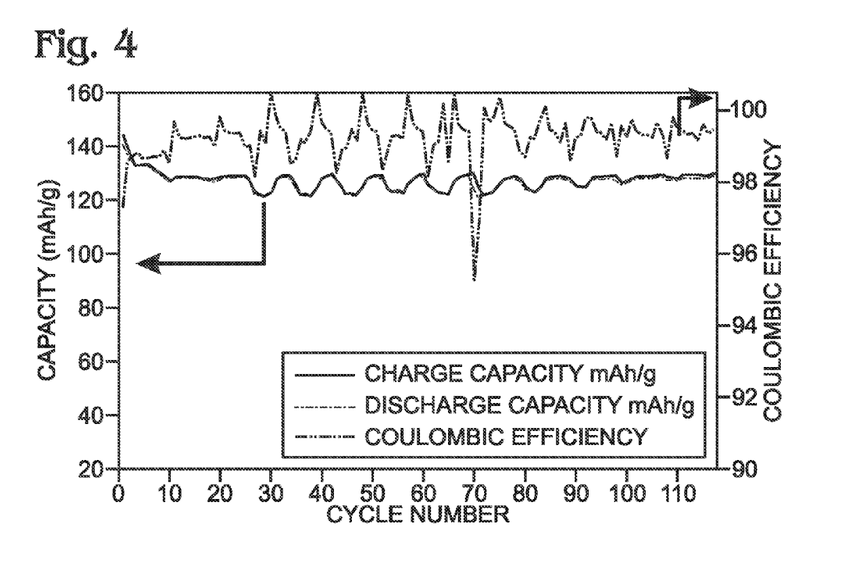
FIGS. 4 and 5 are graphs depicting the capacity retention of MnHCF/Na batteries with 25% and 40% $K^+$, respectively, in the electrolyte ($K^+:Na^+=25:75$ FIG. 4, $K^+:Na^+=40:60$, FIG. 5).
Figure 5:
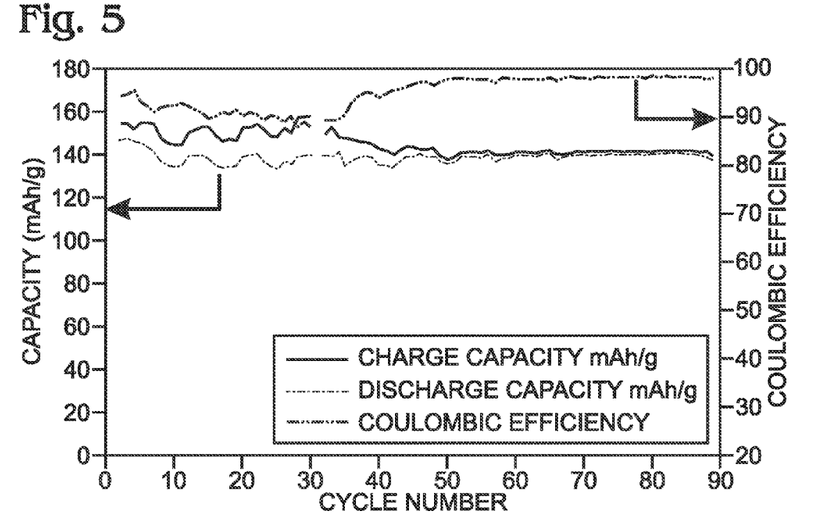

FIGS. 4 and 5 are graphs depicting the capacity retention of MnHCF/Na batteries with 25% and 40% $K^+$, respectively, in the electrolyte ($K^+$:$Na^+$=25:75 FIG. 4, $K^+$:$Na^+$=40:60, FIG. 5). Ultra-stable capacity retention was observed in both of the batteries by increasing the $K^+$ concentration in the electrolyte.

Figure 6:
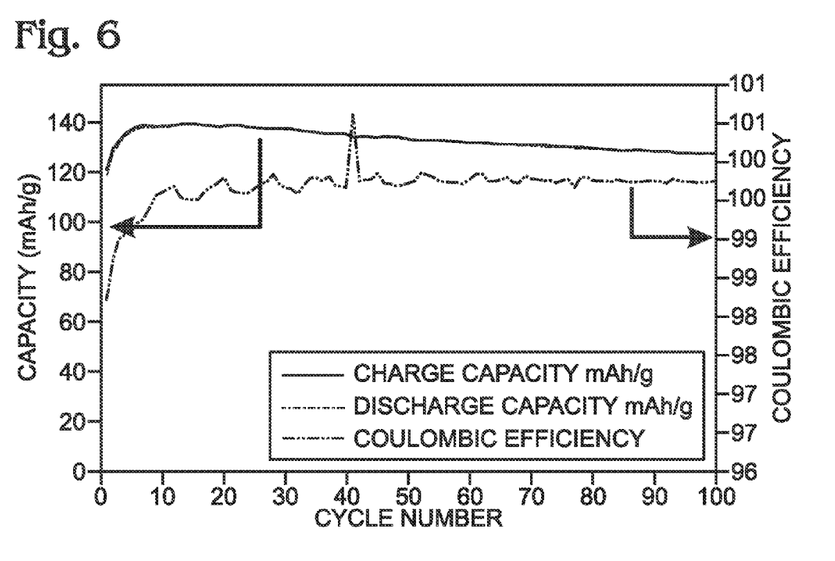
FIG. 6 is a graph depicting another hybrid-ion electrolyte that contains 10% caesium perchlorate ($CsClO_4$) and 90% calcium perchlorate ($NaClO_4$), demonstrating cycle life improvement in MnHCF/Na batteries ($Cs^+:Na^+=10:90$).

FIG. 6 is a graph depicting another hybrid-ion electrolyte that contains 10% caesium perchlorate ($CsClO_4$) and 90% calcium perchlorate ($NaClO_4$), demonstrating cycle life improvement in MnHCF/Na batteries $Cs^+$:$Na^+$=10:90). A hybrid-ion electrolyte comprising 1M $(Cs,Na)ClO_4$ ([Cs]/[Na]=10/90) in ethylene carbonate:propylene carbonate (1:1 v/v) was used as electrolyte for the MnHCF/Na battery. A high capacity retention of 91% was obtained after 100 cycles, which is significantly higher than that of a single-ion electrolyte (1M $NaPF_6$).

Figure 7:
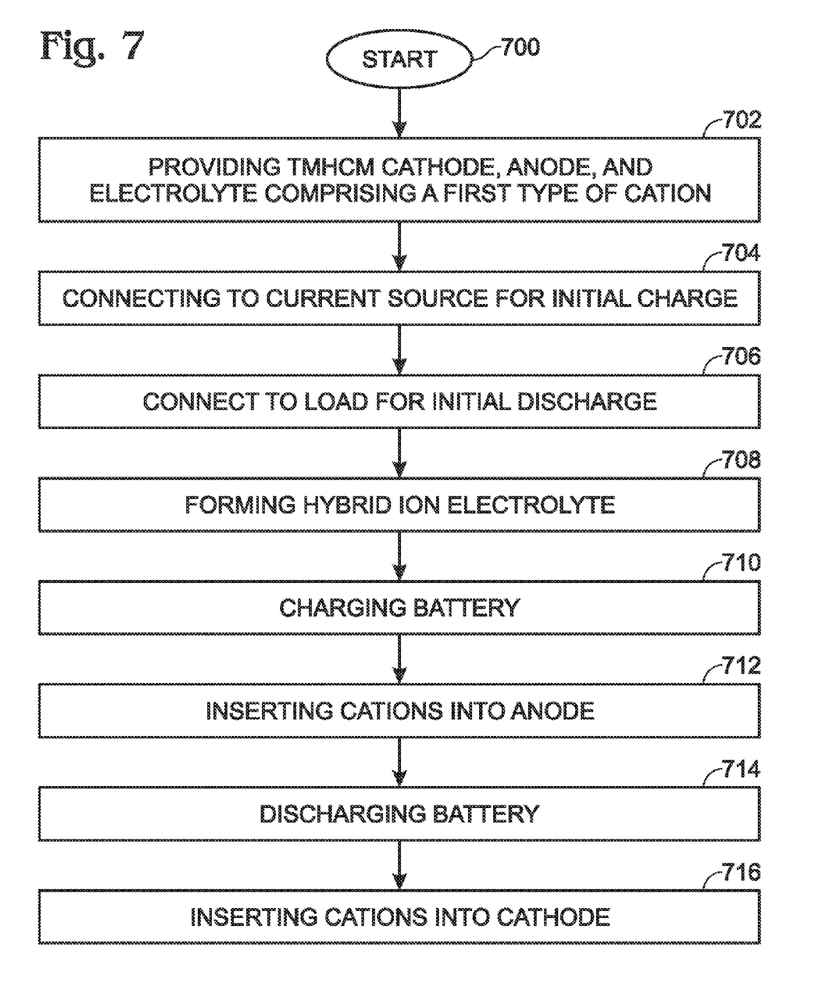
FIG. 7 is a flowchart illustrating a method for forming a rechargeable metal-ion battery with a non-aqueous hybrid ion electrolyte.

FIG. 7 is a flowchart illustrating a method for forming a rechargeable metal-ion battery with a non-aqueous hybrid ion electrolyte. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 700.

Step 702 provides a transition metal hexacyanometallate (TMHCM) cathode having a chemical formula $A_X M1_Y M2_Z (CN)_N \cdot M H_2 O$, where "A" is selected from a first group of metals, and M1 and M2 are transition metals. Also provided is an anode and an electrolyte including a first type of cation selected from the first group of metals, but different than "A". Step 704 connects the cathode and anode to a current source to perform an initial charge operation. Step 706 connects the cathode and anode to a load to perform an initial discharge operation. Step 708 forms a hybrid ion electrolyte including the first type of cation and "A" cations. In one aspect, Step 708 forms the hybrid ion electrolyte with each of the first and second types of cations in the electrolyte comprising at least 1% in molar ratio as compared to the total ion concentration of cations in the electrolyte.

Step 702 provides an anode made from a material such as alkali metals, alkaline earth metals, alloys including tin, alloys including lead, alloys including silicon, alloys including phosphorous, alloys including germanium, titanates including alkali metals, titanates including alkaline earth metals, or combinations thereof. Step 702 provides the first group of metals as follows: lithium (Li), sodium (Na), potassium (K), rubidium (Rb), cesium (Cs), calcium (Ca), strontium (Sr), barium (Ba), silver (Ag), aluminum (Al), magnesium (Mg), and combinations thereof.

Subsequent to the initial charge and discharge operations (Steps 704 and 706), Step 710 connects the cathode and anode to a current source and charges the battery. Step 712 inserts cations into the anode. The cations may alternatively be only "A" cations, only the first type of cation, or both the "A" cations and the first type of cation.

Subsequent to charging the battery in Step 710, Step 714 connects the cathode and anode to a load and discharges the battery. Step 716 inserts cations into the TMHCM particles. The cations may alternatively be only "A" cations, only the first type of cation, or both "A" cations and the first type of cation.

Figure 8:
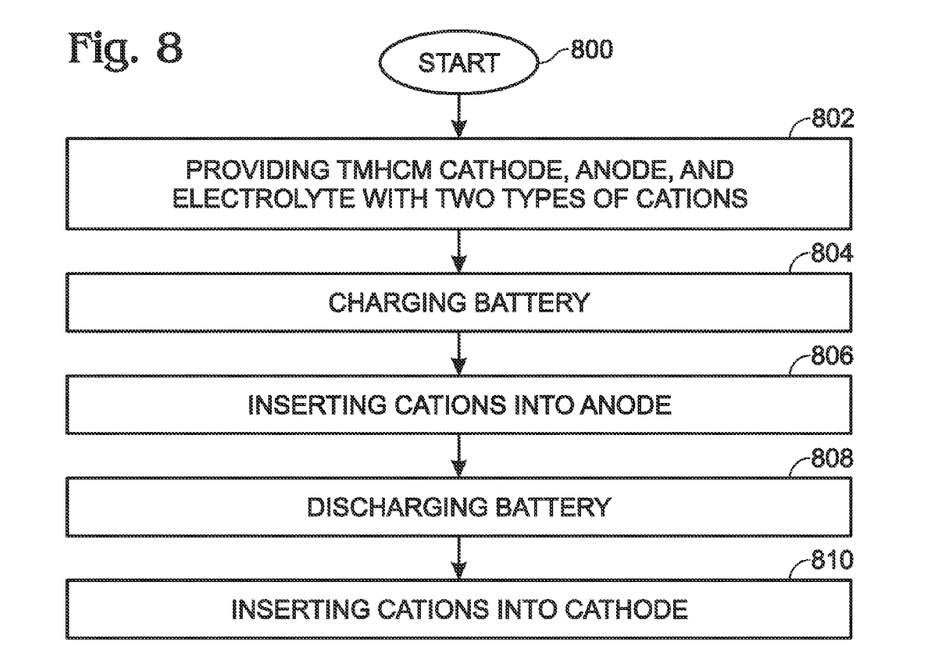
FIG. 8 is a flowchart illustrating a method for operating a rechargeable metal-ion battery with a non-aqueous hybrid ion electrolyte.

FIG. 8 is a flowchart illustrating a method for operating a rechargeable metal-ion battery with a non-aqueous hybrid ion electrolyte. The method begins with Step 800. Step 802 provides a TMHCM cathode having a chemical formula $A_X M1_Y M2_Z (CN)_N \cdot M H_2 O$, where "A" is selected from a first group of metals. Step 802 also provides an anode and an electrolyte including both "A" cations and a first type of cation selected from the first group of metals, but different than "A". Subsequent to an initial charging and discharge cycle, Step 804 connects the cathode and anode to a current source and charges the battery. Step 806 inserts cations into the anode. The cations may alternatively be only "A" cations, only the first type of cation, or both the "A" cations and the first type of cation. Subsequent to charging the battery in Step 806, Step 808 connects the cathode and anode to a load and discharges the battery. Step 810 inserts cations into the TMHCM particles. The cations may alternatively be only "A" cations, only the first type of cation, or both "A" cations and the first type of cation.

With respect to the $A_X M1_Y M2_Z (CN)_N \cdot M H_2 O$:
M1 and M2 are transition metals;
X is less than or equal to 2;
Y is less than or equal to 1;
Z is less than or equal to 1;
N is less than or equal to 6; and,
M is less than or equal to 20.

The first group of metals provided in Step 802 include: lithium (Li), sodium (Na), potassium (K), rubidium (Rb), cesium (Cs), calcium (Ca), strontium (Sr), barium (Ba), silver (Ag), aluminum (Al), magnesium (Mg), and combinations thereof. The anode provided in Step 802 may comprise carbonaceous materials, alkali metals, alkaline earth metals, alloys including tin, alloys including lead, alloys including silicon, alloys including phosphorous, alloys including germanium, titanates including alkali metals, titanates including alkaline earth metals, or combinations thereof.

Figure 9:
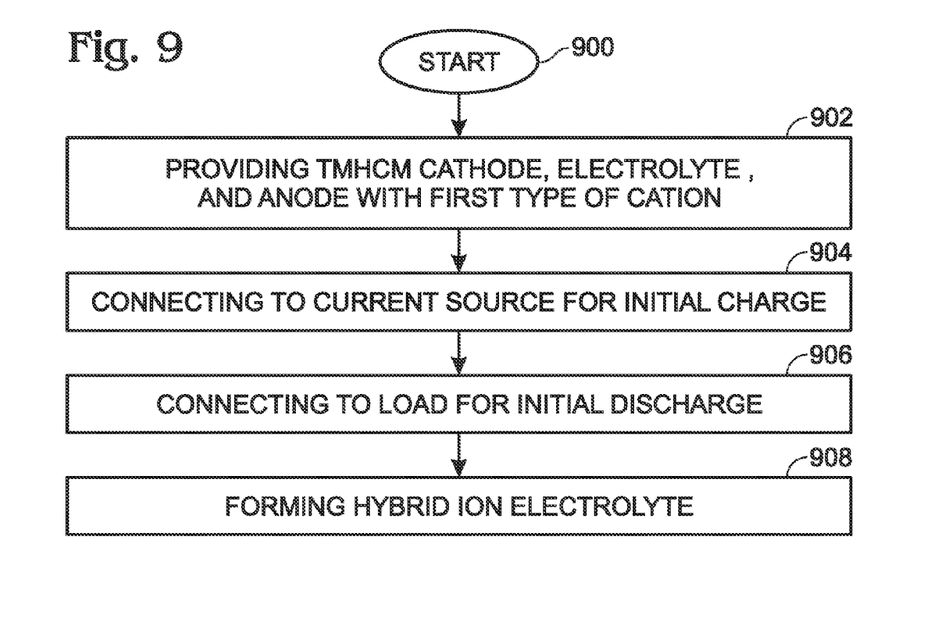
FIG. 9 is a flowchart illustrating a method for forming a rechargeable metal-ion battery with a non-aqueous hybrid ion electrolyte.

FIG. 9 is a flowchart illustrating a method for forming a rechargeable metal-ion battery with a non-aqueous hybrid ion electrolyte. The method starts at Step 900. Step 902 provides a TMHCM cathode having a chemical formula $A_X M1_Y M2_Z (CN)_N \cdot M H_2 O$, where "A" is selected from a first group of metals and M1 and M2 are transition metals. Also provided is an electrolyte, and an anode including a first type of cation selected from the first group of metals, but different than "A". Typically, the electrolyte contains neither the first nor the second type of cation in the initial state as provided in Step 902. Step 904 connects the cathode and anode to a current source to perform an initial charge operation. Step 906 connects the cathode and anode to a load to perform an initial discharge operation. Step 908 forms a hybrid ion electrolyte including the first type of cation and "A" cations. The anode, cathode, and electrolyte materials are the same as mentioned above, and are not repeated here in the interest of brevity.

A rechargeable metal-ion battery with a hybrid ion electrolyte is provided, along with methods for charging and operation of the battery. Examples of particular materials have been presented to illustrate the invention. However, the invention is not limited to merely these examples. Other variations and embodiments of the invention will occur to those skilled in the art.

We claim:

1. A rechargeable metal-ion battery with a hybrid ion electrolyte, the battery comprising:
    a cathode comprising hexacyanometallate (HCM) particles overlying a current collector, the HCM particles having a chemical formula $A_X M1_Y M2_Z (CN)_N \cdot M H_2 O$;
    where "A" is selected from a first group of metals;
    where M1 and M2 are selected from a second group of metals;
    where X is less than or equal to 2;
    where Y is less than or equal to 1;
    where Z is less than or equal to 1;
    where N is less than or equal to 6;
    where M is less than or equal to 20;
    a hybrid ionic non-aqueous electrolyte including a first type of cation selected from the first group of metals and a second type of cation selected from the first group of metals and different than the first type of cation; and,
an anode.

2. The battery of claim 1 wherein the anode is a material selected from the group consisting of carbonaceous materials, alkali metals, alkaline earth metals, alloys including tin, alloys including lead, alloys including silicon, alloys including phosphorous, alloys including germanium, titanates including alkali metals, titanates including alkaline earth metals, and combinations thereof.

3. The battery of claim 1 wherein the first group of metals is selected from the group of metals consisting of lithium (Li), sodium (Na), potassium (K), rubidium (Rb), cesium (Cs), calcium (Ca), strontium (Sr), barium (Ba), silver (Ag), aluminum (Al), magnesium (Mg), and combinations thereof.

4. The battery of claim 1 wherein M1 and M2 are each independently derived, as selected from the group consisting of titanium (Ti), vanadium (V), chromium (Cr), manganese (Mn), iron (Fe), cobalt (Co), nickel (Ni), copper (Cu), zinc (Zn), Ca, Mg, strontium (Sr), and barium (Ba).

5. The battery of claim 1 wherein each of the first and second types of cations in the electrolyte each comprise at least 1% in molar ratio as compared to the total ion concentration of cations in the electrolyte.

6. The battery of claim 1 wherein the cathode HCM particles include cations from only the first type of cation when the battery is in the discharged state.

7. The battery of claim 1 wherein the cathode HCM particles include cations from both the first and second types of cations, when the battery is in a discharged state.

8. The battery of claim 1 wherein the anode includes cations from only the first type of cation, when the battery is in a charged state.

9. The battery of claim 1 wherein the anode includes cations from both the first and second type of cations, when the battery is in a charged state.

10. A method for forming a rechargeable metal-ion battery with a non-aqueous hybrid ion electrolyte, the method comprising:
providing a transition metal hexacyanometallate (TM-HCM) cathode having a chemical formula $A_X M1_Y M2_Z (CN)_N \cdot MH_2O$, where "A" is selected from a first group of metals and M1 and M2 are transition metals, an electrolyte includes a first type of cation selected from the first group of metals and different than "A", and an anode; and,
where X is less than or equal to 2;
where Y is less than or equal to 1;
where Z is less than or equal to 1;
where N is less than or equal to 6;
where M is less than or equal to 20;
connecting the cathode and anode to a current source to perform an initial charge operation;
connecting the cathode and anode to a load to perform an initial discharge operation; and,
forming a hybrid ion non-aqueous electrolyte including the first type of cation and "A" cations.

11. The method of claim 10 wherein providing the anode includes providing an anode made from a material selected from the group consisting of carbonaceous materials, alkali metals, alkaline earth metals, alloys including tin, alloys including lead, alloys including silicon, alloys including phosphorous, alloys including germanium, titanates including alkali metals, titanates including alkaline earth metals, and combinations thereof.

12. The method of claim 10 wherein providing the cathode includes the first group of metals being selected from the group of metals consisting of lithium (Li), sodium (Na), potassium (K), rubidium (Rb), cesium (Cs), calcium (Ca), strontium (Sr), barium (Ba), silver (Ag), aluminum (Al), magnesium (Mg), and combinations thereof.

13. The method of claim 10 wherein forming the hybrid ion electrolyte includes each of the first and second types of cations in the electrolyte comprising at least 1% in molar ratio as compared to the total ion concentration of cations in the electrolyte.

14. The method of claim 10 further comprising:
subsequent to the initial charge and discharge operations, connecting the cathode and anode to a current source and charging the battery;
inserting cations into the anode selected from a group consisting of:
a) only "A" cations;
b) only the first type of cation; and,
c) both the "A" cations and the first type of cation.

15. The method of claim 14 further comprising:
subsequent to charging the battery, connecting the cathode and anode to a load and discharging the battery; and,
inserting cations into the TMHCM particles selected from a group consisting of:
a) only "A" cations;
b) only the first type of cation; and,
c) both "A" cations and the first type of cation.

16. A method for operating a rechargeable metal-ion battery with a non-aqueous hybrid ion electrolyte, the method comprising:
providing a transition metal hexacyanometallate (TM-HCM) cathode having a chemical formula $A_X M1_Y M2_Z (CN)_N \cdot MH_2O$, where "A" is selected from a first group of metals, hybrid ionic a non-aqueous electrolyte including both "A" cations and a first type of cation selected from the first group of metals and different than "A", and an anode;
wherein providing the cathode includes:
M1 and M2 are transition metals;
where X is less than or equal to 2;
where Y is less than or equal to 1;
where Z is less than or equal to 1;
where N is less than or equal to 6;
where M is less than or equal to 20;
subsequent to an initial charging and discharge cycle, connecting the cathode and anode to a current source and charging the battery; and
inserting cations into the anode selected from a group consisting of:
a) only "A" cations;
b) only the first type of cation;
b) both "A" cations the first type of cation;
subsequent to charging the battery, connecting the cathode and anode to a load and discharging the battery; and,
inserting cations into the TMHCM particles selected from a group consisting of;
a) only "A" cations;
b) only the first type of cation; and,
c) both "A" cations and the first type of cation.

17. The method of claim 16 wherein providing the cathode includes the first group of metals comprising lithium (Li), sodium (Na), potassium (K), rubidium (Rb), cesium (Cs), calcium (Ca), strontium (Sr), barium (Ba), silver (Ag), aluminum (Al), magnesium (Mg), and combinations thereof.

18. The method of claim 16 wherein providing the anode includes providing an anode made from a material selected from the group consisting of carbonaceous materials, alkali metals, alkaline earth metals, alloys including tin, alloys including lead, alloys including silicon, alloys including phosphorous, alloys including germanium, titanates including alkali metals, titanates including alkaline earth metals, and combinations thereof.

19. A method for forming a rechargeable metal-ion battery with a non-aqueous hybrid ion electrolyte, the method comprising:
providing a transition metal hexacyanometallate (TMHCM) cathode having a chemical formula $A_X M1_Y M2_Z (CN)_N \cdot MH_2O$, where "A" is selected from a first group of metals and M1 and M2 are transition metals, an electrolyte, and an anode
where X is less than or equal to 2;
where Y is less than or equal to 1;
where Z is less than or equal to 1;
where N is less than or equal to 6;
where M is less than or equal to 20;
including a first type of cation selected from the first group of metals and different than "A";
connecting the cathode and anode to a current source to perform an initial charge operation;
connecting the cathode and anode to a load to perform an initial discharge operation; and,
forming a hybrid ion non-aqueous electrolyte including the first type of cation and "A" cations.

20. The method of claim 19 wherein providing the anode includes providing an anode made from a material selected from the group consisting of carbonaceous materials, alkali metals, alkaline earth metals, alloys including tin, alloys including lead, alloys including silicon, alloys including phosphorous, alloys including germanium, titanates including alkali metals, titanates including alkaline earth metals, and combinations thereof.

21. The method of claim 19 wherein providing the cathode includes the first group of metals being selected from the group of metals consisting of lithium (Li), sodium (Na), potassium (K), rubidium (Rb), cesium (Cs), calcium (Ca), strontium (Sr), barium (Ba), silver (Ag), aluminum (Al), magnesium (Mg), and combinations thereof.

22. A rechargeable metal-ion battery with a hybrid ion electrolyte, the battery comprising:
a cathode comprising transition metal hexacyanometallate (TMHCM) particles overlying a current collector, the TMHCM particles having a chemical formula $A_X M1_Y M2_Z (CN)_N \cdot MH_2O$;
where "A" is selected from a first group of metals;
where M1 and M2 are transition metals;
where X is less than or equal to 2;
where Y is less than or equal to 1;
where Z is less than or equal to 1;
where N is less than or equal to 6;
where M is less than or equal to 20;
a hybrid ionic electrolyte including a first type of cation selected from the first group of metals and a second type of cation selected from the first group of metals and different than the first type of cation; and,
an anode made from a material selected from the group consisting of graphite, hard carbon, carbon black, carbon cloth, carbon paper, alkali metals, alkaline earth metals, alloys including tin, alloys including lead, alloys including silicon, alloys including phosphorous, alloys including germanium, titanates including alkali metals, titanates including alkaline earth metals, and combinations thereof.

23. A rechargeable metal-ion battery with a hybrid ion electrolyte, the battery comprising:
a cathode comprising transition metal hexacyanometallate (TMHCM) particles overlying a current collector, the TMHCM particles having a chemical formula $A_X M1_Y M2_Z (CN)_N \cdot MH_2O$;
where "A" is selected from a first group of metals;
where M1 and M2 are transition metals;
where X is less than or equal to 2;
where Y is less than or equal to 1;
where Z is less than or equal to 1;
where N is less than or equal to 6;
where M is less than or equal to 20;
a hybrid ionic electrolyte including a first type of cation selected from the first group of metals, a second type of cation selected from the first group of metals and different than the first type of cation, and wherein at least one of the first type of cation and second type of cation is a multivalent cation; and,
an anode.

24. The battery of claim 23 wherein both the first type of cation and second type of cation are multivalent cations.

* * * * *